United States Patent
Bolduc

(10) Patent No.: US 7,563,373 B2
(45) Date of Patent: Jul. 21, 2009

(54) REMOVAL OF PHOSPHOROUS FROM WASTEWATER

(75) Inventor: Lysane Bolduc, Gatineau (CA)

(73) Assignee: Seprotech Systems Incorporated, Ottawa, Ontario (CA)

( * ) Notice: Subject to any disclaimer, the term of this patent is extended or adjusted under 35 U.S.C. 154(b) by 258 days.

(21) Appl. No.: 11/464,022

(22) Filed: Aug. 11, 2006

(65) Prior Publication Data

US 2007/0151932 A1 Jul. 5, 2007

(51) Int. Cl.
*C02F 1/58* (2006.01)

(52) U.S. Cl. ............... 210/619; 210/631; 210/638; 210/639; 210/724; 210/726; 210/906

(58) Field of Classification Search .......... 210/906
See application file for complete search history.

(56) References Cited

U.S. PATENT DOCUMENTS

| | | | |
|---|---|---|---|
| 2,074,082 A * | 3/1937 | Domogalla | 210/725 |
| 3,171,802 A | 3/1965 | Rice | |
| 3,423,309 A * | 1/1969 | Albertson | 210/624 |
| 3,453,207 A | 7/1969 | Eck et al. | |
| 3,480,144 A * | 11/1969 | Ettinger et al. | 210/626 |
| 3,506,570 A | 4/1970 | Wukusch | |
| 3,563,385 A * | 2/1971 | Bykov | 210/268 |
| 3,607,738 A | 9/1971 | Nelson | |
| 3,617,569 A | 11/1971 | Daniels et al. | |
| 3,655,552 A | 4/1972 | Flock et al. | |
| 3,964,998 A | 6/1976 | Barnard | |
| 4,029,575 A | 6/1977 | Bykowski et al. | |
| 4,043,910 A | 8/1977 | Field et al. | |
| 4,049,545 A | 9/1977 | Horvath | |
| 4,076,615 A | 2/1978 | Olesen et al. | |
| 4,167,479 A | 9/1979 | Besik | |
| 4,209,396 A | 6/1980 | White et al. | |
| 4,861,472 A * | 8/1989 | Weis | 210/189 |
| 4,981,675 A | 1/1991 | Haase et al. | |
| 5,039,427 A * | 8/1991 | Conover | 210/702 |
| 5,149,400 A | 9/1992 | Haase et al. | |
| 5,271,848 A | 12/1993 | Smith et al. | |
| 5,364,529 A | 11/1994 | Morin et al. | |

(Continued)

OTHER PUBLICATIONS

Gao, et al. "Evaluation of aluminium-silicate polymer composite as a coagulant for water treatment", Water Research, 36(2002): pp. 3573-3581.

(Continued)

*Primary Examiner*—Peter A Hruskoci
(74) *Attorney, Agent, or Firm*—David J. French; Miltons LLP

(57) ABSTRACT

Processes, methods and systems are provided herein for lowering the concentration of phosphorus in wastewater. The process includes adding a suitable amount of an aluminum-based coagulant/flocculent, for example, an aluminum-silicate coagulant/flocculent product to the wastewater while maintaining the pH of the wastewater at between about 4.5 and about 6.65. This step provides an eventual effluent stream of precipitated aluminum-based, phosphorus-containing flocs dispersed in the wastewater. The next step involves physically removing, as by filtering, the precipitated aluminum-based, phosphorus-containing flocs which is dispersed in the wastewater. These steps are able to provide a wastewater effluent containing less than about 0.03 mg total phosphorus per liter of wastewater. The disclosure also teaches novel methods and systems for carrying out the novel process.

27 Claims, 2 Drawing Sheets

U.S. PATENT DOCUMENTS

| | | |
|---|---|---|
| 5,759,401 A | 6/1998 | Boussely et al. |
| 5,853,588 A | 12/1998 | Molof et al. |
| 5,876,606 A | 3/1999 | Blowes et al. |
| 6,165,369 A | 12/2000 | Tanis et al. |
| 7,329,356 B2 * | 2/2008 | Brady ........................ 210/712 |

OTHER PUBLICATIONS

Boisvert, et al. "Phosphate adsorption in flocculation processes of aluminium sulphate and poly-aluminium-silicate-sulphate", Water Research, 31(8) (1997) pp. 1939-1946.

* cited by examiner

REMOVAL OF PHOSPHOROUS FROM WASTEWATER

BACKGROUND OF THE INVENTION

1. Field of the Invention

This invention relates to processes, methods and systems for the treatment of wastewater, for example, domestic wastewater, which is contaminated with phosphorus. In particular, this invention relates to the chemical removal of undesirable chemicals, e.g., phosphorous, from wastewater.

2. Description of the Prior Art

The presence of phosphorus in sewage effluents has been recognized as promoting the growth of algae and aquatic plants in receiving waters by providing a source of nutrition. Phosphorus can be found in sewage in a number of forms, for instance, as soluble, insoluble or complex phosphorous including within organic matter.

Generally, phosphorous is removed from wastewater by chemical precipitation using salts of multivalent metal ions. The most common multivalent metal ions used are calcium, aluminum and iron. Calcium is usually used in the form of lime (calcium hydroxide), aluminum in the form of alum (aluminum sulphate), and iron in the form of ferric chloride. In addition to using a source of multivalent metal ions, polymers are also sometimes added to aid in the formation of flocs. The precipitation/flocculation process is generally followed by the removal of the precipitated/flocculated phosphorous using mechanical means such as by sedimentation or filtration. More recently, polymeric aluminum products such as PASS (polyaluminum silicate-sulphate), PASiC (aluminum-silicate polymer composite), and PAC (hydroxylated polyaluminum chloride) have also been patented (PASS) and tested (PASiC and PAC) in full-scale applications (PASS) and laboratory experiments (PASiC and PAC). The PASS formula, as an example, is defined in U.S. Pat. No. 5,149,400 patented Sep. 22, 1992 by Haase et al as:

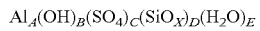

$$Al_4(OH)_B(SO_4)_C(SiO_X)_D(H_2O)_E$$

where A is 1.0, B ranges from 0.75 to 2.0, C ranges from 0.3 to 1.12, D ranges from 0.005 to 0.1, X is greater than 2.0 but less than or equal to 4.0 such as 3=B+2C+2D(X−2), and E is larger than 4 when the product is in aqueous form.

The use of these coagulants/flocculents is generally followed by removal of the resulting precipitate, e.g., by sedimentation or by filtration.

Many patents have been issued which are directed to the removal of phosphorus from wastewater. The more relevant patents are believed to be the following:

U.S. Pat. No. 4,981,675, patented Jan. 1, 1991 by Handy Chemicals Inc., which provided water treatment methods using a polymeric basic aluminum silicate sulfate. The treatments were at:

1) 8-9° C. at a pH of 6.65 to 6.93 and a concentration of 3-8 ppm $Al_2O_3$,
2) 25° C. and at a pH of 7.14-7.38 at a concentration of 3-8 ppm $Al_2O_3$; and U.S. Pat. No. 6,165,369, patented Dec. 26, 2000, by General Chemical Corporation, which teaches a water treatment method that includes the use of polyaluminum silicate sulfate in conjunction with finely-divided, acid-insoluble solid particles.

Other patents of interest include the following:

U.S. Pat. No. 3,171,802, patented Mar. 2, 1965 by A. H. Rice;
U.S. Pat. No. 3,453,207, patented Jul. 1, 1969 by Allied Chemical Corp;
U.S. Pat. No. 3,506,570, patented Apr. 14, 1970 by R. F. Wukusch;
U.S. Pat. No. 3,617,569, patented Nov. 2, 1971 by The Dow Chemical Company;
U.S. Pat. No. 3,607,738, patented Sep. 21, 1971 by Nalco Chemical Company;
U.S. Pat. No. 3,655,552, patented Apr. 11, 1972 by Calgon Corporation;
U.S. Pat. No. 3,964,998 patented Jun. 22, 1976 by The South African Invention Development Corporation;
U.S. Pat. No. 4,029,575 patented Jun. 14, 1977 by Ewing Engineering Company;
U.S. Pat. No. 4,043,910, patented Aug. 23, 1977, by Allied Colloids Limited;
U.S. Pat. No. 4,049,545, patented Sep. 20, 1977 by P. J. Horvath:
U.S. Pat. No. 4,076,615, patented Feb. 28, 1978 by Batelle Pacific N.W. Laboratories;
U.S. Pat. No. 4,167,479, patented Sep. 11, 1979 by F. Besik;
U.S. Pat. No. 4,209,396 patented Jun. 21, 1980 by Filters International;
U.S. Pat. No. 5,271,848, patented Dec. 21, 1993 by R. W. Smith et al;
U.S. Pat. No. 5,364,529, patented Nov. 15, 1994 by Level Valley Dairy Company;
U.S. Pat. No. 5,759,401, patented Jun. 2, 1998 by Elf Atochem;
U.S. Pat. No. 5,853,588, patented Dec. 29, 1998 by Polytechnic University; and
U.S. Pat. No. 5,876,606, patented Mar. 2, 1999, by University of Waterloo.

Other non-patent literature includes:

The publication by Gao et al. in Water Research 36(2002) 3573-3581, on pages 38 to 46 taught that PASiC and PAC could be used as a flocculent agents for water treatment. While there is a mention of PASS (poly-aluminum silicate sulfate) there is no teaching of its use in treating phosphorus-containing water.

The publication of Boisvert et al. in Water Research 31(1997) 1939-1946 focuses on the mechanism of flocculation and does not address the performance with respect to low phosphorus levels in the residual wastewater.

Additionally, Boisvert does not disclose or suggest a stage of filtering the water.

Finally, Boisvert concludes that alum performs better that PASS, (poly-aluminum silicate sulfate) which should lead a person skilled in the art away from trying PASS (poly-aluminum silicate sulfate).

In some existing, known, multi-stage physical/chemical and/or biological wastewater treatment systems, wastewater is processed by a combination of treatment technologies. For example, it is first introduced into a primary settling tank to allow the sedimentation of significant solids from the liquid. Thereafter, the wastewater is introduced into a series of one or more biological reactor tanks, wherein the wastewater is agitated in the presence of aerobic bacteria. One existing technology used for treating the wastewater at this stage, hereafter used as an example, is the employment of rotating biological contactors (RBC), i.e., large rotating disks serving as a support to a fixed-film of bacteria.

According to known procedures, a flocculent can be added to the wastewater while it is in the biological reactor. In some prior art systems, the addition of flocculent occurs when the wastewater has been partially, but not fully treated in the biological reactor, e.g., in the third stage of a four stage RBC. Because the biological reactions using aerobic bacteria must be carried-out at a pH level around 6.8 or higher, the coagulant/flocculent according to this known procedure is introduced into wastewater which has been adjusted, using another chemical, in order to have a pH of, for example, of 6.8 to 7.6.

Thus, in existing systems, a portion of the phosphorus present in wastewater is used for microbial metabolism and another portion precipitates-out and forms flocs in the biological reactor. Some of this precipitate in some systems is removed from the last stage of the biological reactor and returned to the primary settling tank where it is allowed to accumulate. This is done in order to minimize the amount of precipitate that is fed to the next stage in the wastewater treatment process.

In these existing systems, the wastewater leaving the biological reactor is typically fed to a second, quiescent, settling tank which is not subject to mechanical agitation. There, further settling of precipitated phosphorus is allowed to occur. The sludge from the bottom of such second (or final) settling tank is periodically pumped back to the primary settling tank where the phosphorus-enriched sludge accumulates. Pumping of the sludge from the secondary to the primary settling tank is optional.

The removal of phosphorous to very low levels with any degree of consistency has been problematic. In one aspect, the invention strives for consistent phosphorous removal of to such low levels, for example <0.03 mg/l.

It is thus recognized that there is a need for treatment processes, methods and systems for lowering the concentration of phosphorus present in wastewater that is effective, does not significantly put other pollutants into the water and uses materials that are readily and economically available. This invention addresses this need.

The present invention can be advantageously combined with various types of wastewater treatment systems including Rotating Biological Contactors.

The invention in its general form will first be described, and then its implementation in terms of specific embodiments will be detailed with reference to the drawings following hereafter. These embodiments are intended to demonstrate the principle of the invention, and the manner of its implementation. The invention in its broadest sense and more specific forms will then be further described, and defined, in each of the individual claims which conclude this Specification.

SUMMARY OF THE INVENTION

By a first broad aspect, the present invention provides a process for lowering the concentration of phosphorus in wastewater which includes the step of adding a suitable amount of an aluminum-based coagulant/flocculent to the wastewater while maintaining a pH of between about 4.5 and 6.65. This step provides an eventual effluent stream of precipitated aluminum-based, phosphorus-containing flocs dispersed in the wastewater that are suitable for removal by physical means such as filtration. Carrying through with these steps may provide a wastewater effluent generally containing less than about 0.03 mg total phosphorus per liter of wastewater.

By a second broad aspect, the present invention provides a process as described above wherein the aluminum-based coagulant/flocculent is an aluminum-silicate based coagulant/flocculent product.

By a third broad aspect, the present invention provides a method of reducing the content of phosphorus in wastewater by including the step of introducing wastewater containing phosphorus into a preliminary treatment zone, in which a settling zone is cooperatively associated with the treatment zone. The method then includes the step of adding aluminum-based coagulant/flocculent to the wastewater in the preliminary treatment zone, preferably a less than a suitable amount of aluminum-based coagulant/flocculent, while maintaining a pH above about 6.8 to about 7.6, thereby to produce precipitated aluminum-based phosphorus-containing flocs in the wastewater. The method also includes the optional step of removing at least some of the precipitated aluminum-based phosphorus-containing flocs from the settling zone. This latter step can be taken while settling is allowed to occur or intermittently.

The latter method also includes the further steps of:
1) passing liquid effluent including some of the precipitated aluminum-based, phosphorus-containing flocs from the final settling zone to a mixing zone, preferably an in-line mixer;
2) adding upstream or in the mixing zone an additional quantity of an aluminum-based coagulant/flocculent to the liquid effluent to achieve a total suitable amount of the aluminum-based coagulant/flocculent in the wastewater to react with all of the phosphorous contained therein, while maintaining the pH of the wastewater after such addition within the range of about 4.5 to 6.65. This second addition of a quantity of aluminum-based coagulant/flocculent will have the effect of lowering the pH to a level which is generally below the value maintained in the previous step (typically between of 6.8-7.6, initially). If the pH of the water at this stage is not sufficiently lower than the initial pH, it can be further lowered through the addition of an acid, such as an inorganic or an organic acid selected from the group consisting of sulfuric acid, hydrochloric acid, nitric acid, acetic acid, citric acid, or any other acid which is appropriate for lowering the pH of water at this stage.

These steps provide an effluent stream of precipitated aluminum-based phosphorus-containing flocs dispersed in the wastewater. The method then includes the step of passing the effluent stream of the precipitated aluminum-based, phosphorus-containing flocs dispersed in the wastewater to a physical separation zone.

The method concludes with the steps of:
1) physically removing the precipitated aluminum-based phosphorus-containing flocs dispersed in the wastewater; and,
2) recovering substantially precipitate-free wastewater which has passed through the physical removal zone.

These steps allow to produce a wastewater effluent containing less than about 0.03 mg total phosphorus per liter of wastewater.

By a fourth broad aspect, the present invention provides a process as just described above wherein the aluminum-based coagulant/flocculent is an aluminum-silicate based coagulant/flocculent product.

By a fifth broad aspect, the present invention provides a system for lowering the concentration of phosphorus in wastewater. The system includes a first treatment chamber which has:
1) wastewater inlet and outlet lines conveying the wastewater in and out of the treatment chamber; the treatment chamber itself may include a single or several treatment processes hence it may be a simple vessel or may be more complex and include various types of treatment equipment, and
2) a coagulant/flocculent inlet line connected to the first treatment chamber for the introduction of a first amount of an aluminum-based coagulant/flocculent into the first treatment chamber for the formation of aluminum-based phosphorus-containing flocs, and 3) a pH control inlet line connected to the first treatment chamber for the introduction of a chemical for the maintenance of the pH in the first treatment chamber above about 6.8 to about 7.6.

Such first treatment chamber is associated to a settling chamber for the sedimentation and removal of a part of the precipitated aluminum-based, phosphorus-containing flocs that are thereupon formed.

The system also includes a mixing chamber in direct communication with the outlet line from the final settling chamber. The mixing chamber, preferably an in-line mixer, includes:

1) A wastewater inlet line; and
2) an inlet line for the introduction of an aluminum-based coagulant/flocculent chemical into or upstream the in-line mixing chamber,
3) a pH control inlet line into or upstream the in-line mixing chamber for the introduction of a chemical for the maintenance of the pH at about 4.5 to 6.65, and
4) a wastewater outlet line connected to a physical separation vessel for the physical separation of the further precipitated aluminum-based, phosphorus-containing flocs from the wastewater; and,
5) an outlet line from the physical separation vessel for the essentially precipitate-free effluent wastewater stream having a total phosphorus level of less than about 0.03 mg per liter of wastewater.

By a sixth broad aspect, the present invention provides a process as just described above wherein the aluminum-based coagulant/flocculent is an aluminum-silicate coagulant/flocculent product.

Thus, according to an aspect of the present invention, a second addition of flocculent/coagulant is made after the wastewater has left the second, quiescent, settling tank. This is conveniently done through an in-line mixer in which or prior to which further flocculent/coagulant addition prior to feeding the wastewater to a final solid/liquid separator. This final solid/liquid separator may be in the form of a filter which has the capability of removing flocculated or very fine phosphorus-containing particles from the wastewater, and allows achieving Total Phosphorous levels lower than 0.03 mg/litre.

It is a feature of an aspect of the invention that the pH of the wastewater fed to the final liquid/solid separator and filter is set in the pH range of 4.5 to 6.65. Many coagulants/flocculents, and particularly alumina-based coagulants/flocculents, e.g. aluminum sulfate and alumina-silica-sulfate, have the ability and tendency to lower the pH of the wastewater. Accordingly, the mere addition of such coagulants/flocculents can be used to adjust the pH of the wastewater as it is being treated in or upstream the in-line mixer. It may be desirable, in order to minimize the use of coagulant/flocculent needed, to adjust the pH of the wastewater by the adding an appropriate acid, such as sulfuric acid, hydrochloric acid, nitric acid, acetic acid, citric acid, etc. when the concentration of the coagulant/flocculent is insufficient to reduce the pH down to the desired range.

While it is useful and possible to add the entirety of the coagulant/flocculent to be fed to the wastewater in one stage, it has been found advantageous to use two (or possibly more) dosing points as follows: a first amount is added to the wastewater while in the preferred bioreactor or preliminary treatment zone, and a second amount which is typically added downstream from the final settling tank, more preferably in an in-line mixing zone or immediately upstream. Such a two-stage addition may have the benefit of conserving expensive coagulant/flocculent. The amount of coagulant/flocculent needed is that which will essentially treat all of the phosphorus present in the wastewater. The minimum amount required is hereafter referenced as the "suitable amount" and is the amount of aluminum-silicate coagulant/flocculent product appropriate to substantially precipitate and form flocs of most of the phosphorus present in the wastewater.

Typically, the greater part of the total amount needed of coagulant/flocculent to be consumed is added in the first stage of the treatment process, i.e., to the wastewater when it is present in the biological reactor. Thus, about 70 to 80% of the coagulant/flocculent which is to be injected may be added at this initial stage. The remaining amount of coagulant/flocculent, according to this preferred aspect of the invention, is added to the water in or immediately upstream of the in-line mixer upon leaving the final (or secondary) quiescent settling tank.

The facultative additional use of an acid to the wastewater downstream from the quiescent final settling tank is not necessary if the wastewater in the biological reactor does not have an excessively high pH. The pH of the wastewater in the biological reactor is generally maintained in the region of about 6.8-7.6 by the addition of a base or alkaline product. By carefully limiting the amount of base being added at the earlier biological reaction stage, the necessity to add either an excessive amount of acidifying coagulant/flocculent or another acid can be minimized or eliminated.

Other Features of the Invention

By a broad feature of the process aspects of the present invention, the suitable amount of the aluminum-based coagulant/flocculent chemical, e.g., the aluminum-silicate coagulant/flocculent product, is from about 15 to about 50 mg of $Al_2O_3$ per liter of wastewater. Preferably, the suitable amount of the aluminum-based coagulant/flocculent chemical, e.g., the aluminum-silicate coagulant/flocculent product, is from about 35 to about 40 mg of $Al_2O_3$ per liter of said wastewater.

By another broad feature of the process aspects of the present invention, the pH is maintained through the addition of an inorganic acid or an organic acid. Preferably, the acid is acetic acid, or citric acid, or sulfuric acid, or hydrochloric acid or nitric acid.

By another broad feature of the process aspects of the present invention, the aluminumsilicate coagulant/flocculent product is selected from the group consisting of polyaluminum silicate sulfate, polyaluminum silicate chloride, polyaluminum hydroxychlorosulfate, and polyaluminum chloride. Preferably, the aluminum-silicate coagulant/flocculent product is polyaluminum silicate sulfate or PASS.

By another broad feature of the process aspects of the present invention, the process includes the preliminary step of adding an amount of the aluminum-based coagulant/flocculent, e.g., the aluminum-silicate coagulant/flocculent product, to the wastewater, preferably less than a "suitable" amount, while maintaining a pH between about 6.8 to about 7.6 in order to provide precipitated aluminum-based, phosphorus-containing flocs prior to the previously-recited steps. This provides an eventual effluent stream with precipitated aluminum-based, phosphorus-containing flocs dispersed in the wastewater.

Preferably, such preliminary step is carried out in a preliminary reaction zone that also includes an aerobic biological reactor. More preferably, the pH is maintained at about 7.0 in such an aerobic biological reactor.

By another broad feature of the process aspects of the present invention, the step of maintaining the pH within about 6.8 to about 7.6 is carried out by the addition of a suitable amount of a weak base. Preferably, the weak base is sodium bicarbonate.

By another broad feature of the process aspects of the present invention, the final settling tank is a zone which is distinct and separate from both the preliminary treatment zone and the in-line mixing zone.

By a broad feature of the method aspects of the present invention, the less than suitable amount of the aluminum-based coagulant/flocculent chemical, e.g., the aluminum-silicate coagulant/flocculent product, which is added in said preliminary treatment zone comprises about 70% to about 80%, e.g., about 75%, of the suitable amount of the aluminum-based coagulant/flocculent chemical, wherein such a suitable amount is the amount of aluminum-silicate coagulant/flocculent product appropriate to substantially precipitate and form flocs of all of the phosphorus present in the wastewater.

By another broad feature of the method aspects of the present invention, the method includes the step of removing settled precipitated aluminum-based, phosphorus-containing flocs from the final settling zone. Preferably, precipitated aluminum-based, phosphorus-containing flocs which have been removed from the final settling zone are transferred to the primary settling tank.

By another broad feature of the method aspects of the present invention, the pH of about 4.5 to about 6.65 in the in-line mixing zone is achieved by the cooperative addition of a suitable amount of the aluminum-based coagulant/flocculent, e.g., the aluminum-silicate coagulant/flocculent product, and/or an acid. Preferably, the acid is selected from the group consisting of sulfuric acid, hydrochloric acid, nitric acid, acetic acid and citric acid. Preferably, also, the aluminum-based coagulant/flocculent chemical, is polyaluminum silicate sulfate.

By another broad feature of the system aspects of the present invention, the final settling chamber, which is cooperatively associated with the first treatment chamber, is a final settling tank that is separate and distinct both from the first treatment chamber and from the in-line mixer treatment chamber.

By another broad feature of the system aspects of the present invention, the final settling chamber includes a sludge removal line for the transfer of settled aluminum-based, phosphorus-containing flocs. Preferably, such sludge removal line is connected to the primary settling tank as a recycle line.

By another broad feature of the system aspects of the present invention, the filter chamber is selected from the group consisting of sand filters, multimedia filters, ultrafiltration membranes and microfiltration membranes. In particular, the filter may be a continuous, self-cleaning sand filter.

By another broad feature of the system aspects of the present invention, the system includes a sludge removal line from the filter chamber for the removal of the filtered aluminum-based, phosphorus-containing flocs. Preferably the sludge removal line is connected to the primary settling tank as a recycle line.

By another broad feature of the system aspects of the present invention, the first treatment chamber is a rotating biological contactor.

The foregoing summarizes the main features of the invention and some of its optional aspects. The invention may be further understood by the description of the preferred embodiments, in conjunction with the drawings, which now follow.

BRIEF DESCRIPTION OF THE DRAWINGS

In the accompanying drawings.

DESCRIPTION OF THE PREFERRED EMBODIMENTS

Figure 1:
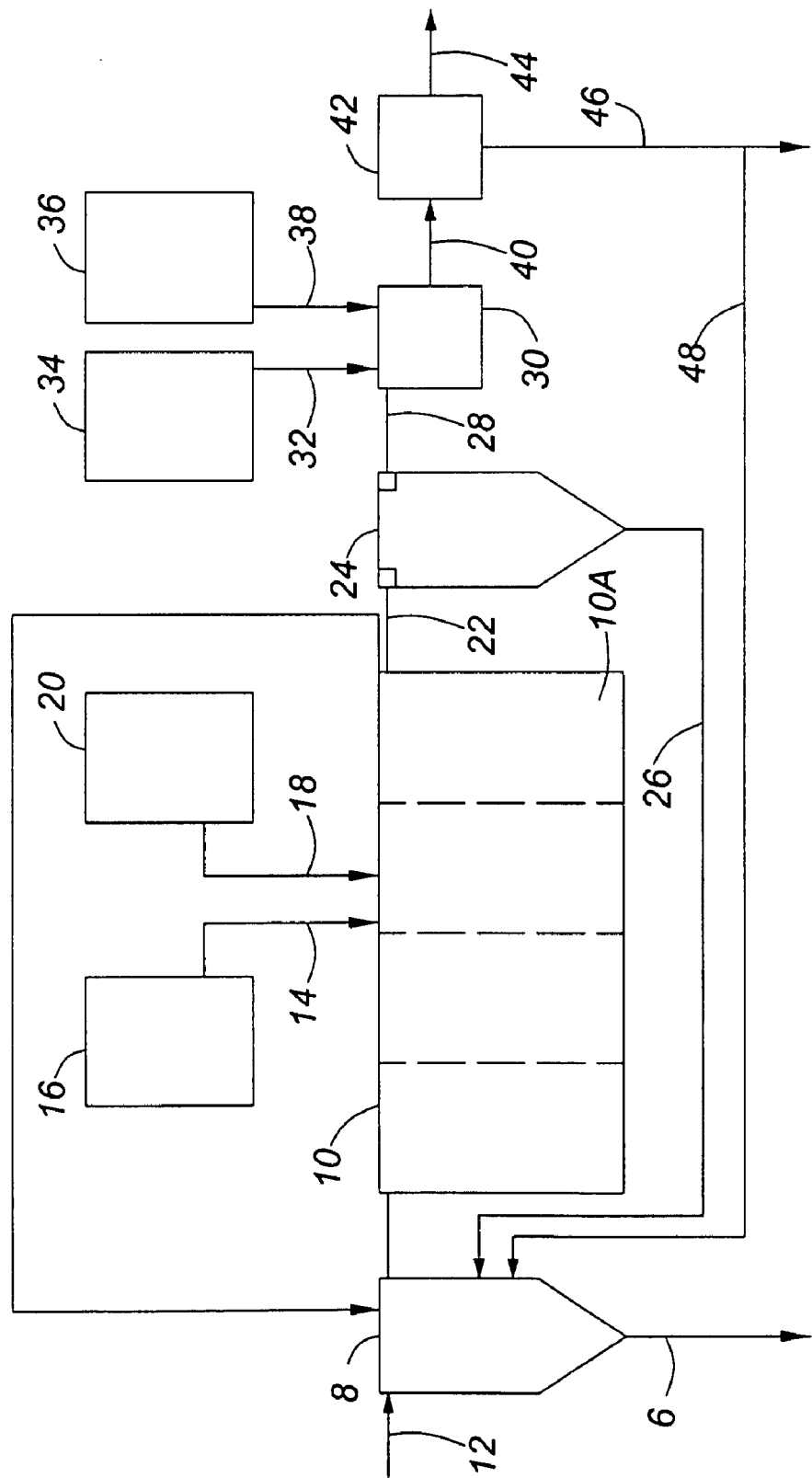
FIG. 1 is a schematic flow diagram of a system, according to one embodiment of the present invention, for carrying out the method according to another embodiment of the present invention.
Figure 2:
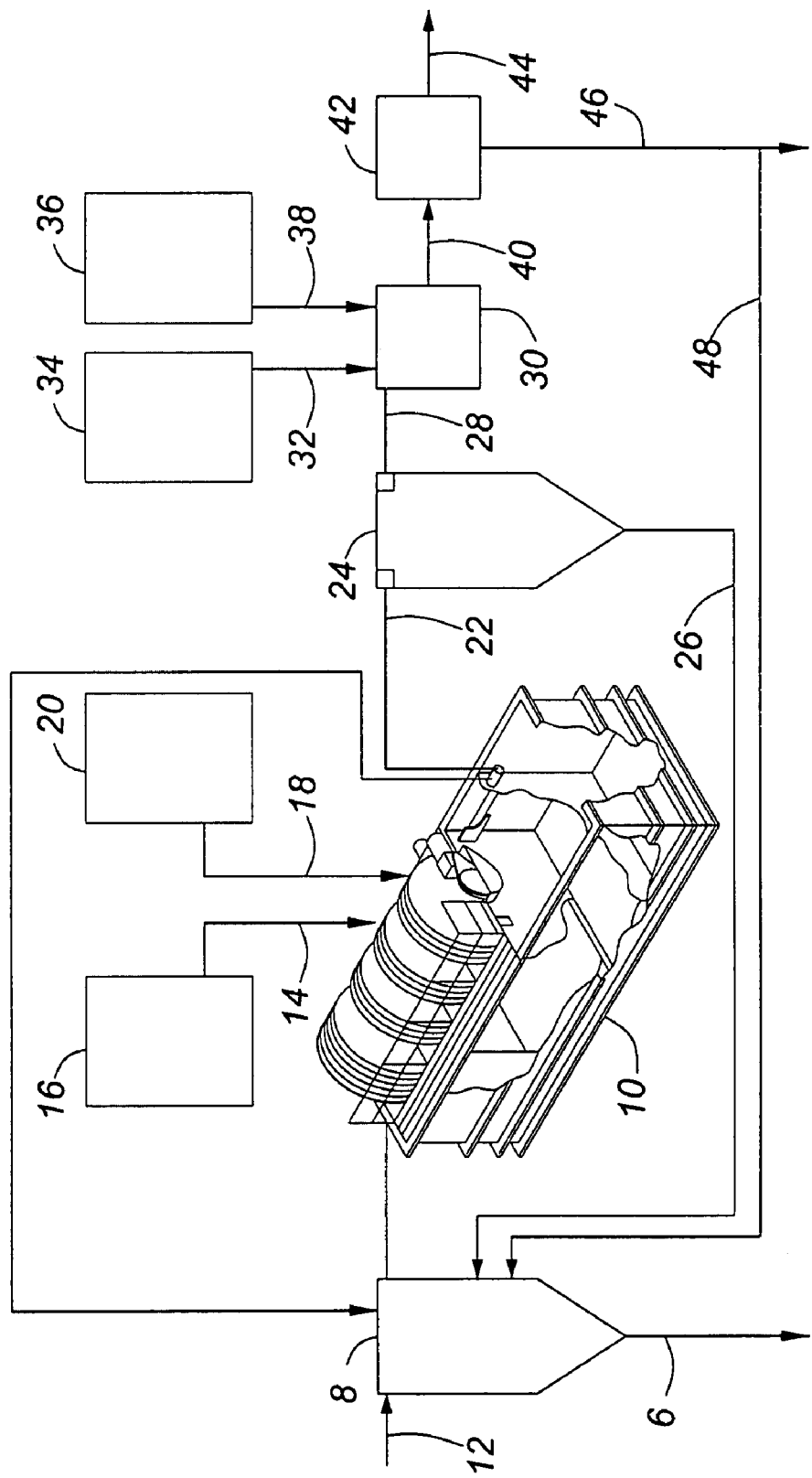
FIG. 2 is a schematic flow diagram of the system of FIG. 1 which shows one embodiment of a treatment chamber 10 with its associated parts as well as the relationship between these parts and the associated exterior parts of the system of the invention.

As seen in FIG 1, a first chamber is a primary treatment chamber 10 which may be of any construction of apparatus which is presently used in the purification and treatment of wastewater and serves as a preliminary treatment zone. For example, in a preferred embodiment in the present case, this treatment chamber may be a Rotating Biological Contactor (RBC). This primary treatment chamber 10 provides a primary treatment zone for the production of filterable precipitated flocs dispersed in the wastewater. A wastewater inlet feed line, pipe or conduit 12 is connected to the primary settling tank 8 to allow the sedimentation of significant solids. The primary settling tank 8 overflows into the treatment chamber 10 for the introduction of wastewater which is contaminated with phosphorus. The phosphorus may be in a number of forms, for instance as soluble, insoluble or complex phosphorus including within organic matter. A coagulant/flocculent inlet line, pipe or conduit 14 is connected to the treatment chamber 10 in order to supply a major amount of coagulant/flocculent to the wastewater. The coagulant/flocculent inlet line, pipe or conduit 14 is connected to a coagulant/flocculent reservoir tank 16 which contains coagulant/flocculent in the form of an aqueous solution. The coagulant/flocculent is an aluminum-based coagulant/flocculent chemical, e.g., polyaluminum silicate sulphate, polyaluminum silicate chloride, polyaluminum hydroxychlorosulphate, aluminum sulphate or polyaluminum chloride. Preferably, the aluminum-silicate coagulant product is polyaluminum silicate sulphate (PASS). PASS may be obtained from L'Environment Eaglebrook Quebec, Varennes, Quebec.

The amount of aluminum-based coagulant/flocculent chemical or PASS added to the primary treatment chamber 10 is a major amount of the total amount of PASS to be added for the appropriate precipitation and flocculation of most of the phosphorus present in the wastewater. Such total amount of PASS is from about 15 to about 50 mg $Al_2O_3$ per liter of wastewater, but preferably from about 35 to about 40 mg of $Al_2O_3$ per liter of the wastewater. The major amount of the total amount of PASS is generally from about 70% to about 80%, preferably about 75%, of the total amount.

A pH control inlet line, pipe or conduit 18 is connected to the treatment chamber 10 and to a pH control agent reservoir tank 20 which contains a base, preferably, sodium bicarbonate, in order to supply an amount of a pH control agent to the wastewater. In this primary treatment chamber 10, the pH is actually controlled to stay above 6.65, preferably within a range of about 6.8 to about 7.6, but more preferably to remain at a pH of about 7.0 in order to facilitate the biological reactions occurring in parallel to the phosphorus removal. Again, the pH is maintained at such level through the addition of the base.

The primary treatment chamber 10 also includes a discharge line 22, e.g., an overflow line 22, for the discharge of wastewater having filterable, precipitated flocs dispersed therein from the primary treatment chamber 10. In this primary treatment chamber 10, some of the filterable precipitated flocs are allowed to settle in what may be considered an incidental settling chamber.

A final settling chamber 24 is connected directly to the effluent from the primary treatment chamber 10 by the overflow line 22, providing a settling zone. By means of such overflow line 22, some of the filterable precipitated flocs are transferred along with the wastewater from the primary treatment chamber 10 to the final settling chamber for further solids removal. This typically allows wastewater containing a maximum of 1 mg of phosphorus per liter of wastewater to leave the final settling chamber 24. A settled sludge removal line 26 is connected from the bottom of the final settling chamber 24 to the primary settling tank 8 and acts as a solids recycle line. The final settling chamber 24 includes an upper discharge or outlet line 28.

While the final settling chamber 24 and the primary treatment chamber 10 are shown as two separated and distinct chambers, the final settling chamber 24 can effectively be present as part of the incidental settling chamber, i.e., as part of a compartmentalized version of the primary treatment chamber 10, e.g., by being separated from the primary treatment chamber 10, by an internal overflow weir (not shown).

An in-line mixer 30 is directly connected to the final settling chamber 24 by means of the upper discharge or outlet line 28. In or upstream the in-line mixer 30, additional PASS is added and pH is monitored and maintained in the range of about 4.5 to 6.65. A coagulant/flocculent inlet line, pipe or conduit 32 is connected upstream or to the in-line mixer 30 in order to supply the additional minor amount of coagulant/flocculent to the wastewater. This second injection allows to reach the previously designated total amount of coagulant/flocculent necessary. The coagulant/flocculent inlet line, pipe or conduit 32 is connected to a coagulant/flocculent reservoir tank 34 which contains coagulant in the form of an aqueous solution.

The pH control inlet line, pipe or conduit 18 is connected the treatment chamber 10 in order to supply a major amount of a pH control agent to the wastewater when it is present in the treatment chamber 10. The in-line mixer 30 includes a pH control inlet line, pipe or conduit 38 connected thereto. The pH control agent is connected to a reservoir tank 36 which contains an acid, preferably, sulfuric acid, hydrochloric acid, nitric acid, acetic acid or citric acid. In or upstream this in-line mixer 30, the pH is actually controlled to about 4.5 to about 6.65, preferably, to about 6.4. The pH may be adjusted by changing the amount of polyaluminum silicate sulfate which is added, and/or by introducing a suitable amount of a suitable acid from the reservoir tank 36 through line, pipe or conduit 38. With such proper total amount of PASS and proper control of both the amount of PASS and the amount of acid added to or upstream the in-line mixer 30, phosphorus levels less than 0.03 mg per liter of wastewater can be achieved at the exit of the filter chamber.

Line, pipe or conduit 40 is connected from the in-line mixer reaction chamber 30 to a filter chamber 42 where the filterable, precipitated flocs dispersed in the wastewater are filtered out. Any suitable filter may be used in the filter chamber 42, e.g., a sand filter, an ultrafiltration membrane or a microfiltration membrane. If a sand filter is used, it may be of a type that is continuous, self-cleaning. A stream of essentially precipitant-free, phosphorus-free wastewater is withdrawn through outlet line, pipe or conduit 44 from filter chamber 42. Such effluent stream typically contains less than about 0.03 mg of total phosphorus per liter of wastewater.

A lower sludge removal line 46 is connected to the bottom of the filter chamber 42. This sludge removal line 46 may be provided to remove and discharge all of the filtered flocs. Sludge removal line 46 may include a recycle line 48 to return the sludge back to the first treatment chamber 10.

CONCLUSION

The specific method of treatment of wastewater contaminated with phosphorus as disclosed hereinabove is able to provide an effluent stream of substantially phosphorus-free water which typically contains less than 0.03 mg of total phosphorus per liter of wastewater.

The description has constituted a description of specific embodiments showing how the invention may be applied and put into use. These embodiments are only exemplary. The invention, in its broadest and more specific aspects, is further described and defined in the claims which follow.

These claims, and the language used therein are to be understood in terms of the variants of the invention which have been described. They are not to be restricted to such variants, but are to be read as covering the full scope of the invention as is implicit within the invention and the disclosure that has been provided herein.

The invention claimed is:

1. A process for lowering the concentration of total phosphorus in wastewater discharged from a settling chamber to a level below about 0.03 milligrams per liter comprising:
   a) treating the wastewater by adding to said wastewater a suitable amount of aluminum-based coagulant/flocculent for precipitation of phosphorus in said wastewater, the wastewater having a pH of about 4.5 to 6.4 during such treatment, to provide an eventual effluent stream of wastewater with precipitated aluminum-based, phosphorus-containing flocs dispersed in said wastewater; and
   b) filtering said precipitated aluminum-based, phosphorus-containing flocs from said eventual effluent stream of wastewater to lower the concentration of total phosphorus in the effluent stream of treated wastewater to a level below about 0.03 milligrams per liter.

2. A process for lowering the concentration of total phosphorus in wastewater to a level below about 0.03 milligrams per liter comprising:
   a) treating the wastewater by adding to said wastewater a suitable amount of aluminum-based coagulant/flocculent for precipitation of the phosphorus in said wastewater to provide a stream of wastewater with precipitated aluminum-based, phosphorus-containing flocs dispersed in said wastewater; and
   b) a step of physically removing a necessary amount of said precipitated flocs from said stream of wastewater to lower the concentration of total phosphorus in a treated effluent stream wastewater to a level below about 0.03 milligrams per liter,
   and wherein the suitable amount of aluminum-based coagulant/flocculent is divided into:
   c) a first amount of aluminum-based coagulant/flocculent, and;
   d) a second amount of aluminum-based coagulant/flocculent,
   and wherein the step of adding the suitable amount of aluminum-based coagulant/flocculent includes:
   e) the preliminary step of adding, in a preliminary treatment zone, the first amount of aluminum-based coagulant/flocculent to said wastewater while the pH of the wastewater is maintained above 6.65 to produce precipitated aluminum-based, phosphorus-containing flocs, f) transferring the wastewater from the preliminary treatment zone to a settling zone wherein at least a portion of the said flocs is allowed to settle from the wastewater while the wastewater is in the settling zone, g) separating the wastewater from the settled flocs, h) a further step adding the second amount of aluminum-based coagulant/flocculent to said separated wastewater while the pH of the wastewater is maintained at or below 6.4 to produce further precipitated flocs, and wherein the step of physically removing precipitated flocs from the wastewater includes the step of filtering precipitated flocs from said wastewater sufficiently to lower the concentration of total phosphorus in the effluent stream of treated wastewater to said level of below about 0.03 milligrams per liter.

3. The process as claimed in claim 2, wherein the pH of the wastewater during the further step of adding the second amount of aluminum-based coagulant/flocculent is maintained at or between 4.5 and 6.4.

4. The process as claimed in claim 3, wherein the pH of the wastewater, when the first amount of aluminum-based coagulant/flocculent is added, is maintained at about 6.8 to about 7.6.

5. The process as claimed in claim 4, wherein, as part of a further step, the wastewater from the settling zone is passed to an in-line mixing zone, and wherein said second amount of aluminum-based coagulant/flocculent product is added to the wastewater in or upstream of the in-line mixing zone.

6. The process as claimed in claim 5, wherein:
the pH of the wastewater in the preliminary treatment zone is maintained at about 7.0;
and wherein said first amount of aluminum-based coagulant/flocculent comprises about 75% by weight of said suitable amount of said aluminum-based coagulant/flocculent;
and wherein the aluminum-based coagulant/flocculent is polyaluminum silicate sulphate;
and wherein said suitable amount of aluminum-based coagulant/flocculent is from about 15 to about 50 milligrams as $Al_2O_3$ per liter of said wastewater;
and wherein the physical removal of a substantial portion of said precipitated flocs from said effluent stream of wastewater is effected through the use of continuous self-cleaning sand filters.

7. The process as claimed in claim 4, wherein the pH of the wastewater in the preliminary treatment zone is maintained at about 6.8 to about 7.6 through the addition of a base to the wastewater.

8. The process as claimed in claim 1 of treating the wastewater at said pH of about 4.5 to 6.4, or the process as claimed in claim 2, 3, 4, 5 or 7 wherein the step by which the pH of the wastewater is maintained at or below 6.4, is effected through the addition of a suitable amount of an acid.

9. The process as claimed in claim 8 wherein the acid is selected from the group consisting of sulfuric acid, hydrochloric acid, nitric acid, acetic acid, citric acid.

10. The process as claimed in claim 8, wherein the aluminum-based coagulant/flocculent is selected from the group consisting of polyaluminum silicate sulphate, polyaluminum silicate chloride, polyaluminum hydroxychlorosulphate, aluminum sulphate, and polyaluminum chloride.

11. The process as claimed in claim 10, wherein the aluminum-based coagulant/flocculent is polyaluminum silicate sulphate.

12. The process as claimed in claim 1 of treating the wastewater at said pH of about 4.5 to 6.4, or the process as claimed in claim 2, 3, 4, 5 or 7, wherein the step by which the pH of the wastewater is maintained at or below 6.4, is effected through the addition of a suitable amount of an aluminum-based coagulant/flocculent.

13. The process as claimed in claim 12, wherein the aluminium-based coagulant/flocculent is selected from the group consisting of polyaluminium silicate sulphate, polyaluminium silicate chloride, polyaluminium hydroxychlorosulphate, aluminium sulphate, and polyaluminium chloride.

14. The process as claimed in claim 13, wherein the aluminium-based coagulant/flocculent is polyaluminium silicate sulphate.

15. The process as claimed in claim 12 wherein the treating of the wastewater at a pH of 4.5 to 6.4 or the step by which the pH of the wastewater is maintained at or below 6.4, is effected through the addition of a suitable amount of an acid in addition to an aluminium-based coagulant/flocculent.

16. The process as claimed in claim 15, wherein the aluminium-based coagulant/flocculent is selected from the group consisting of polyaluminium silicate sulphate, polyaluminium silicate chloride, polyaluminium hydroxychlorosulphate, aluminium sulphate, and polyaluminium chloride.

17. The process as claimed in claim 16, wherein the aluminium-based coagulant/flocculent is polyaluminium silicate sulphate.

18. The process as claimed in claim 16 wherein the acid is selected from the group consisting of sulfuric acid, hydrochloric acid, nitric acid, acetic acid, and citric acid.

19. The process as claimed in claim 15 wherein the acid is selected from the group consisting of sulfuric acid, hydrochloric acid, nitric acid, acetic acid, and citric acid.

20. The process as claimed in claim 2 or 3, wherein said first amount of aluminium-based coagulant/flocculent comprises about 70% to about 80% by weight of said suitable amount of said aluminium-based coagulant/flocculent.

21. The process as claimed in claim 1, 2, 3, 4, 5, or 7 wherein the aluminium-based coagulant/flocculent is selected from the group consisting of polyaluminium silicate sulphate, polyaluminium silicate chloride, polyaluminium hydroxychlorosulphate, aluminium sulphate, and polyaluminium chloride.

22. The process as claimed in claim 21, wherein the aluminium-based coagulant/flocculent is polyaluminium silicate sulphate.

23. The process as claimed in claim 1, 2, or 3 wherein said suitable amount of aluminium-based coagulant/flocculent is from about 15 to about 50 milligrams as $Al_2O_3$ per liter of said wastewater.

24. The process as claimed in claim 1, 2, 3, 4, 5, or 7 wherein the filtering of said precipitated flocs from said stream of wastewater is effected through the use of a filter chosen from the list consisting of sand filters, multimedia filters, ultrafiltration membranes and microfiltration membranes.

25. The process as claimed in claim 2, 3, 4, 5, or 7 wherein the preliminary step of adding, in the preliminary treatment zone, the first amount of aluminium-based coagulant/flocculent to said wastewater is effected in a biological reactor.

26. The process of claim 25 wherein said biological reactor is a rotating biological contactor.

27. The process of claim 25 wherein the aluminium-based coagulant/flocculent is polyaluminium silicate sulphate.

* * * * *